United States Patent [19]

Era et al.

[11] Patent Number: 4,927,735
[45] Date of Patent: May 22, 1990

[54] NOVEL NAPHTHALOCYANINE DYE, METHOD FOR PREPARING THE SAME, AND OPTICAL INFORMATION RECORDING MEDIUM EMPLOYING THE SAME

[75] Inventors: Susumu Era; Setsuo Kobayashi; Akio Mukoh, all of Hitachi, Japan

[73] Assignee: Hitachi Chemical Company, Ltd., Tokyo, Japan

[21] Appl. No.: 140,248

[22] Filed: Dec. 31, 1987

[30] Foreign Application Priority Data

Jan. 7, 1987 [JP] Japan ................................. 62-452

[51] Int. Cl.$^5$ .......................... G11B 7/24; B41M 5/26; G03C 1/72; C07D 487/22
[52] U.S. Cl. ..................................... 430/270; 430/495; 430/945; 346/135.1; 540/128; 540/140
[58] Field of Search .................... 430/270, 495, 945; 346/135.1; 540/128, 139, 140, 121, 143

[56] References Cited

U.S. PATENT DOCUMENTS

| | | | |
|---|---|---|---|
| 4,131,609 | 12/1978 | Wynne et al. | 540/128 |
| 4,719,613 | 1/1988 | Hirose et al. | 430/495 |
| 4,725,525 | 2/1988 | Kenney et al. | 430/270 |
| 4,766,054 | 8/1988 | Hirose et al. | 430/270 |

FOREIGN PATENT DOCUMENTS

| | | |
|---|---|---|
| 243205 | 10/1987 | European Pat. Off. . |
| 25886 | 10/1985 | Japan . |
| 78787 | 11/1986 | Japan . |
| 16948 | 3/1987 | Japan . |
| 177287 | 4/1987 | Japan . |

*Primary Examiner*—Paul R. Michl
*Assistant Examiner*—Mark R. Buscher
*Attorney, Agent, or Firm*—Antonelli, Terry & Wands

[57] ABSTRACT

Disclosed are a novel naphthalocyanine dye shown in the specification, a method for preparing the same, and an optical information recording medium employing the same.

According to the present invention, there can be obtained a novel naphthalocyanine dye, a method for preparing the same, and an optical information recording medium employing the same, which has excellent characteristics in recording/reading out property and in reading stability.

12 Claims, 3 Drawing Sheets

NOVEL NAPHTHALOCYANINE DYE, METHOD FOR PREPARING THE SAME, AND OPTICAL INFORMATION RECORDING MEDIUM EMPLOYING THE SAME

BACKGROUND OF THE INVENTION

The present invention relates to a novel naphthalocyanine dye, a method for preparing the same, and an optical information recording medium employing the same.

An optical information recording medium has an excellent characteristic feature that no wearing out or deterioration will not occur since the medium is used without coming into contact with a recording or a reading out head, and therefore developing researches have been made on various kinds of recording mediums. Particularly in the field of heat mode recording systems utilizing laser diode and the like, low-melting metals, organic polymers and dyes have been proposed as materials capable of melting, evaporating and sublimating. Above all, an organic film containing an organic polymer or a dye is preferable from view of high recording sensitivity, owing to a low heat conductivity and a low melting or sublimating temperature. As examples of such dyes, various materials such as cyanine dyes and squalirium dyes have been proposed.

Heretofore, the optical information recording medium in which the dye is used as a recording layer has been known, as disclosed in Japanese Patent Provisional Publication No. 16948/1981. However, if it is attempted to utilize this kind of dye film recording layer as a reflection type optical information recording medium, a metallic reflective film will be additionally required, which makes the medium constitution complicated and leads to the deterioration in information recording/reading out properties disadvantageously. In order to overcome this problem, it has been proposed to make use of a cyanine type dye or the like having a suitably high reflectance, as disclosed in Japanese Patent Provisional Publication No. 78787/1985. However, the cyanine type dye generally is poor in stability against light, and therefore it is liable to be decolorized by repeated irradiation of a reading beam at the time of reading after writing, with the result that an S/N ratio for the reading decreases inconveniently.

On the other hand, Japanese Patent Provisional Publication Nos. 25886/1986 and 177287/1986 propose to employ to the recording layer a naphthalocyanine compound as the dye which is excellent in light fastness. With regard to the naphthalocyanine dye disclosed in the former literature, its reflectance is usually lower as compared with the cyanine dye, and for this reason, its recording/reading out properties are poor and unsatisfactory. Further, in the latter literature, it is proposed to apply a material similar to the naphthalocyanine dye of the present invention to the information recording medium, but no examples for exhibiting effectiveness as the optical information recording medium have not been disclosed at all. Therefore, such a publication does not enable a person skilled in the art to judge whether the recording/reading out properties are excellent or not, or the level of reflectance is fully satisfactory or not.

In view of such a situation, intensive researches have been conducted to eliminate the above-mentioned drawbacks of the conventional techniques. As a result, it has been found that a novel naphthalocyanine dye synthesized by the present inventors has a reflectance equal to or higher than that of a cyanine type dye and is excellent in reading stability, when used to form an optical information recording medium, to accomplish the present invention.

SUMMARY OF THE INVENTION

An object of the present invention is to provide a novel naphthalocyanine dye, a method for preparing the same, and an optical information recording medium employing the same, which has excellent characteristics in recording/reading out property and in reading stability. Namely, the present invention provides a novel naphthalocyanine dye represented by the general formula (I):

wherein R is an alkyl group having 1 to 22 carbon atoms or an aryl group and three Rs may be the same or different; M is selected from the group consisting of Si, Al, Ti, Ge and Sn;

$Y_1$ and $Y_2$ are selected from the group consisting of OR′, OAr, OSi(R′)$_3$, OSi(Ar)$_3$ and OC(Ar)$_3$ and may be the same of different, with the proviso that when M is Al, $Y_1$ alone should be bound to M and $Y_2$ is absent, in which R′ is an alkyl group having 1 to 22 carbon atoms, and Ar is an aryl group or an aralkyl group, a method for preparing the same, and an optical information recording medium employing the same.

DETAILED DESCRIPTION OF THE INVENTION

A first aspect of the present invention is directed to a novel naphthalocyanine dye represented by the general formula (I) as described above.

The novel naphthalocyanine dye having the above general formula (I) is soluble in any of aromatic, halogen type, ether type and ketone type solvents, and can be easily purified to heighten its purity. Additionally, with regard to the naphthalocyanine dye, its ability to absorb a laser diode beam is remarkably high and is not varied depending on the kind, concentration and the like of the solvent, and its reflectance and stability against light are also high.

The above-mentioned aromatic solvent includes benzene, toluene, xylene, chlorobenzene, 1-chloronaphthalene and quinoline; the above ether type solvent includes diethyl ether, dibutyl ether, tetrahydrofuran, ethylene glycol monomethyl ether, ethylene glycol dimethyl ether, diethylene glycol monomethyl ether and diethylene glycol dimethyl ether; the above ketone type solvent includes acetone, methyl ethyl ketone, methyl propyl ketone, cyclopentanone, cyclohexanone and acetone alcohol.

The alkyl group having 1 to 22 carbon atoms represented by R in the general formula (I) includes a methyl goup, ethyl group, propyl group, isopropyl group, butyl group, sec-butyl group, tert-butyl group, pentyl goup, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, eicosyl group, heneicosyl group and docosyl group, and above all, the methyl and ethyl groups are preferable. The aryl group represented by R in the general formula (I) includes a phenyl group, tolyl group, xylyl group, hydroxyphenyl group, naphtyl group, anthryl group and pyrenyl group, and above all the phenyl group is preferable. The symbol M in the general formula (I) is selected from the group consisting of Si, Al, Ti, Ge and Sn, as described above. The symbols $Y_1$ and $Y_2$ in the general formula (I) are selected from the group consisting of OR', OAr, OSi(R')$_3$, OSi(Ar)$_3$ and OC(Ar)$_3$ and may be the same or different mutually. Above all, OR' OAr, OSi(R')$_3$ and OSi(Ar)$_3$ are preferable. When M is Al, $Y_1$ alone is bound to M and $Y_2$ is absent, and in other cases, $Y_1$ and $Y_2$ both are bound thereto. The alkyl group having 1 to 22 carbon atoms represented by R' in $Y_1$ and $Y_2$ includes the above-mentioned examples of the alkyl groups represented by R, and above all, the alkyl group having 1 to 18 carbon atoms is preferable. The aryl group represented by Ar in $Y_1$ and $Y_2$ includes the above-mentioned examples of the aryl group represented by R, and above all, the phenyl group is preferable. The aralkyl group represented by Ar in $Y_1$ and $Y_2$ includes a benzyl group, phenethyl group, methylbenzyl group and naphthylmethyl group, and above all, the benzyl and methylbenzyl groups are preferable. Exemplary compounds of the novel naphthalocyanine dye are as follows:

(1) $[(n-C_6H_{13})_3SiO]_2SiNc[Si(CH_3)_3]_4$
Bis(trihexylsilyloxy)-tetrakis(trimethylsilyl)naphthalocyanino-silicon
(in the above formula, Nc is a naphtalocyanine skeleton)

(2) $[(CH_3)_3SiO]_2SiNc[Si(CH_3)_3]_4$
Bis(trimethylsilyloxy)-tetrakis(trimethylsilyl)naphthalocyanino-silicon (3) $[(C_2H_5)_3SiO]_2GeNc[Si(CH_3)_3]_4$
Bis(triethylsilyloxy)-tetrakis(trimethylsilyl)naphthalocyanino-germanium (4) $[(n-C_4H_9)_3SiO]_2SnNc[Si(CH_3)_3]_4$
Bis(tributylsilyloxy)-tetrakis(trimethylsilyl)naphthalocyanino-tin (5) $C_6H_5OAlNc[Si(CH_3)_3]_4$
Tetrakis(trimethylsilyl)naphthalocyanino-phenoxyaluminum (6) $[(n-C_3H_7)_3SiO]_2TiNc[Si(CH_3)_3]_4$
Bis(tripropylsilyloxy)-tetrakis(dimethylsilyl)naphthalocyanino-titanium (7) $[(CH_3)_3SiO]_2SiNc[Si(CH_3)_2C_6H_5]_4$
Bis(trimethylsilyloxy)-tetrakis(trimethylphenylsilyl)-naphthalocyanino-silicon (8) $(C_2H_5O)_2SiNc[Si(C_6H_5)_3]_4$
Diethoxy-tetrakis(triphenylsilyl)naphthalocyanino(9)

(9) $[(C_6H_5)_3SiO]_2SiNc[Si(C_2H_5)_3]_4$
Bis(triphenylsilyloxy)-tetrakis(triethylsilyl)naphthalocyanino-silicon (10) $[(n-C_4H_9)_3SiO]_2SiNc[Si(n-C_4H_9)_3]_4$
Bis(tributylsilyloxy)-tetrakis(tributylsilyl)naphthalocyanino-silicon

(11) $[(C_2H_5)_3SiO]_2SiNc[Si(CH_3)_2n-C_{18}H_{37}]_4$
Bis(triethylsilyloxy)-tetrakis(dimethyloctadecylsilyl)-naphthalocyanino-silicon (12) $[(C_2H_5)_3SiO]_2SiNc[Si(CH_3)_2n-C_{10}H_{21}]_4$
Bis(triethylsilyloxy)-tetrakis(dimethyldecylsilyl)-naphthalocyanino-silicon (13) $[(C_2H_5)_3SiO]_2GeNc[Si(CH_3)_2n-C_{14}H_{29}]_4$
Bis(triethylsilyloxy)-tetrakis(dimethyltetradecylsilyl)-naphthalocyanino-germanium Among these compounds, the compound (3) is preferable.

A second aspect of the present invention is directed to a method for preparing a novel naphthalocyanine dye represented by the following general formula (I):

wherein R is an alkyl group having 1 to 22 carbon atoms or an aryl group and three Rs may be the same or different; M is selected from the group consisting of Si, Al, Ti, Ge and Sn;

$Y_1$ and $Y_2$ are selected from the group consisting of OR', OAr, OSi(R')$_3$, OSi(Ar)$_3$ and OC(Ar)$_3$ and may be the same of different, with the proviso that when M is Al, $Y_1$ alone should be bound to M and $Y_2$ is absent, in which R' is an alkyl group having 1 to 22 carbon atoms, and

Ar is an aryl group or an aralkyl group,
which comprises the steps:
(a) reacting at least one of trialkylsilyl- or triarylsilyl-2,3-dicyanonaphthalenes represented by the following general formula (II):

wherein R is as defined above,
with a metal halide represented by the following general formula (III):

MXn                   (III)

wherein M is as defined above, X is a halogen atom, and n is a positive integer which is the number of X bound to M,
to form a dihalogenometal-tetrakis(trialkylsilyl or triarylsilyl)naphthalocyanine compound represented by the following general formula (IV):

wherein R, M and X are as defined above, (b) hydrolyzing the resulting compound represented by the general formula (IV) to form a dihydroxymetal-tetrakis(trialkylsilyl or triarylsilyl)naphthalocyanine compound represented by the following general formula (V):

wherein R and M are as defined above, and (c) reacting the resulting compound represented by the general formula (V) with an alcohol represented by the general formula (VI):

R''OH               (VI)

wherein R'' is selected from the group consisting of R', Ar, Si(R')$_3$, Si(Ar)$_3$ and C(Ar)$_3$ in which R' is an alkyl group having 1 to 22 carbon atoms, Ar is an aryl group, and R' and Ar may be the same or different, or with a halogen compound represented by the following formula (VII):

R''Cl               (VII)

wherein R'' is as defined above.

The novel naphthalocyanine dye represented by the general formula (I) may be prepared by reacting under heating the compound represented by the general formula (V) with an excess amount of the alcohol represented by the general formula (VI) or the halide represented by the general formula (VII). In this reaction, a reaction temperature is preferably within the range of 80° to 250° C., and a reaction time is preferably within the range of 30 minutes to 10 hours. This reaction may be carried out in the absence of or preferably in the presence of a solvent such as benzene, toluene, xylene, trimethylbenzene, chlorobenzene, dichlorobenzene, trichlorobenzene, 1-chloronaphthalene, tetralin, pyridine, β-picoline and quinoline.

The isolation/purification of the novel naphthalocyanine dye represented by the general formula (I) from the resulting reaction mixture may be carried out by separating the desired compound from the reaction mixture by use of column chromatography or thin-layer chromatography, and then purifying it by recrystallization.

The dihydroxymetal-tetrakis(trialkylsilyl or triarylsilyl)naphthalocyanine compound represented by the general formula (V) may be prepared by hydrolyzing the compound represented by the general formula (IV) under heating. In this hydrolysis, a reaction temperature is preferably within the range of 50° to 150° C., and a reaction time is preferably within the range of 30 minutes to 10 hours. The hydrolysis is preferably performed in a mixed solvent such as pyridine/water, pyridine/ammonia water, methanol/ammonia water, ethanol/ammonia water or propanol/ammonia water, or alternatively by treating with concentrated sulfuric acid and then with ammonia water.

In the metallic halide having the general formula (III), usable halogen atoms are Cl, Br, I and the like.

The trialkylsilyl- or triarylsilyl-2,3-dicyanonaphthalene represented by the general formula (II) are known compounds and may be prepared, for example, by the following procedure:

A 2,3- or 3,4-dimethyltrialkylsilyl- or -triarylsilylbenzene represented by the following general formula (VIII):

wherein R is an alkyl group having 1 to 22 carbon atoms or an aryl group,
and N-bromosuccinimide represented by the formula (IX):

(IX)

are subjected to photo-irradiation under heating to form a compound represented by the general formula (X):

(X)

wherein R is an alkyl having 1 to 22 carbon atoms or an aryl group.

Next, the thus prepared compound having the general formula (X) is reacted under heating with fumaronitrile represented by the formula (XI):

(XI)

to form the desired trialkylsilyl- or triarylsilyl-2,3-dicyanonaphthalene represented by the general formula (II). In the present invention, if necessary, two or more kinds of compounds represented by the general formula (II) may be reacted with the metallic halide represented by the general formula (III).

In general, the above reaction of 2,3- or 3,4-dimethyltrialkylsilyl- or -triarylsilylbenzene represented by the general formula (VIII) with N-bromosuccinimide represented by the formula (IX) may be carried out by heating under reflux in an amount of 0.2 mol of the former and 0.8 mol of the latter for 4 to 12 hours under the irradiation by use of a high-pressure mercury vapor lamp in 200 to 1,000 ml of a solvent which is inactive to this photo-irradiation. In this reaction, a peroxide which is a radical generator is required to be added as an initiator for the photo-reaction. The peroxide includes benzoyl peroxide, octanoyl peroxide, cyclohexanone peroxide, isobutyryl peroxide, 2,4-dichlorobenzoyl peroxide and methyl ethyl ketone peroxide. In general, the peroxide can be used in an amount ranging from 500 mg to 2 g based on 500 ml of the solvent.

The solvent which is inactive to the photo-irradiation can be suitably selected from halogen type solvents such as chloroform and carbon tetrachloride, or aromatic solvents such as benzene and chlorobenzene.

The reaction of the compound represented by the general formula (X) with the fumaronitrile represented by the formula (XI) is carried out in the presence of 1 mol of the former and 1 to 2 mol of the latter, and in this case, a reaction temperature is preferably within the range of 70° to 100° C. and a reaction time is preferably within the range of 5 to 10 hours. Preferable solvent includes polar organic solvents such as N,N-dimethylformamide, N,N-dimethylacetamide, dimethyl sulfoxide, N,N-diethylformamide and N,N-diethylacetamide.

A third aspect of the present invention is directed to an optical information recording medium in which an organic film containing a naphthalocyanine dye represented by the following general formula (I) as the main component is formed on a substrate:

(I)

wherein R is an alkyl group having 1 to 22 carbon atoms or an aryl group and three Rs may be the same or different; M is selected from the group consisting of Si, Al, Ti, Ge and Sn;

$Y_1$ and $Y_2$ are selected from the group consisting of OR′, OAr, OSi(R′)$_3$, OSi(Ar)$_3$ and OC(Ar)$_3$ and may be the same of different, with the proviso that when M is Al, $Y_1$ alone should be bound to M and $Y_2$ is absent, in which R′ is an alkyl group having 1 to 22 carbon atoms, and Ar is an aryl group or an aralkyl group, In the optical information recording medium, a recording layer comprising the novel naphthalocyanine dye of the first aspect of the present invention as a main component is provided on a substrate. If desired, other layers such as a primary coat and protective layer may be additionally formed thereon.

The usable substrate is known to a person skilled in the art and may be permeable or impermeasble to a laser beam used. However, when write and read are carried out on the side of the substrate by the laser beam, the substrate must be permeable to the laser beam, whereas when writing and reading are carried out on the reverse side to the substrate, i.e., on the side of the recording layer, the substrate may not be permeable to the laser beam. The substrate may be made from a material usually used, and examples of the substrate materials include glasses, quartz, ceramic, plastics, papers, and plane-like and foil-like metals. If desired, some guide grooves having a concavo-convex structure may be formed on the substrate.

The formation of the recording layer can be achieved in accordance with a coating method, a printing method or an evaporating method. In the case of the optical information recording medium, the utilization of the coating method is economically advantageous to form the recording layer, and also in the present invention, it is desirable to make use of the coating method or printing method. In the case of the coating method, a solvent is used such as toluene, chloroform, dichloroethane and methyl ethyl ketone and the like, and it may be carried out by spraying, roller coating, spin coating or dipping and the like.

The optical information recording medium employs, as the recording layer, the organic film mainly comprising the novel naphthalocyanine dye which has suitable absorbance and reflectance in the wavelength range of the laser beam and which is excellent in light stability, and therefore it possesses good recording/reading out properties and improved reading stability. In addition, the novel naphthalocyanine dye is excellent in solubility in various organic solvents, and the formation process of the recording layer is also predominant over conventional techniques.

EXAMPLES

Now, the present invention is described in detail in reference to Examples, but it should not be limited to these Examples.

EXAMPLE 1

Synthesis of
Bis(triethylsilyloxy)-tetrakis(trimethyl)-naphthalocyanino-germanium (Exemplary compound No. 3)

(i) Synthesis of 4-trimethylsilyl-o-xylene

To 14.4 g of magnesium turnings which had been sufficiently dried, a small amount of an iodine crystal and then 250 ml of ethyl ether were added. A solution of 92.5 g of 4-bromo-o-xylene in 100 ml of ethyl ether was added dropwise to the resulting mixture over about 2 hours in a nitrogen atmosphere under gentle reflux. After completion of addition, stirring was continued for about 1 hour to prepare a Grignard reagent completely.

To a solution of trimethylchlorosilane (90 g) and ethyl ether (250 ml) was added dropwise the thus prepared Grignard reagent over about 1 hour under reflux, and then the reflux was additionally continued for 1 hour. After cooling on an ice bath, an aqueous saturated ammonium chloride solution was added dropwise thereto in order to decompose the Grignard reagent, followed by separating an ether layer from the reaction mixture. The remaining aqueous solution was extracted three times with benzene, and the resulting extracts were collected and then dried with anhydrous magnesium sulfate. This solution was concentrated and distilled under reduced pressure to obtain 40 g of colorless liquid of 4-trimethylsilyl- o-xylene at a boiling point of 98° to 103° C./27 to 30 mmHg.

(ii) Synthesis of
6-trimethylsilyl-2,3-dicyanonaphthalene

One gram of benzoyl peroxide was added to 500 ml of a carbon tetrachloride solution containing 35.6 g of 4-trimethylsilyl-o-xylene and 142.4 g of N-bromosuccinimide. The solution was irradiated by a high-pressure mercury lamp (100 W) for about 12 hours under reflux. After cooling, precipitated white crystals were removed by filtration, and the carbon tetrachloride solution which was a mother liquor was concentrated sufficiently under reduced pressure. The resulting light brown oil was then dissolved in 800 ml of anhydrous N,N-dimethylformamide, and 27 g of fumaronitrile and then 200 g of sodium iodide were added thereto with adequate stirring. The solution was then stirred at 75° C. for about 7 hours in a nitrogen atmosphere. After the reaction, the solution was poured into about 4 kg of ice, and sodium hydrogensulfite was added thereto gradually until the red-brown tint of the aqueous solution changed into a light yellow. A slightly excess amount of sodium hydrogensulfite was added thereto, and stirring was then carried out for a certain period of time. The solution was allowed to stand overnight at room temperature. A precipitated light yellow solid was filtered, washed with water sufficiently, and further washed with methanol several times. The resulting solid was then recrystallized from ethanol/acetone to obtain 16 g of colorless crystalline, 6-trimethylsilyl-2,3-dicyanonaphthalene.

Figure 1:
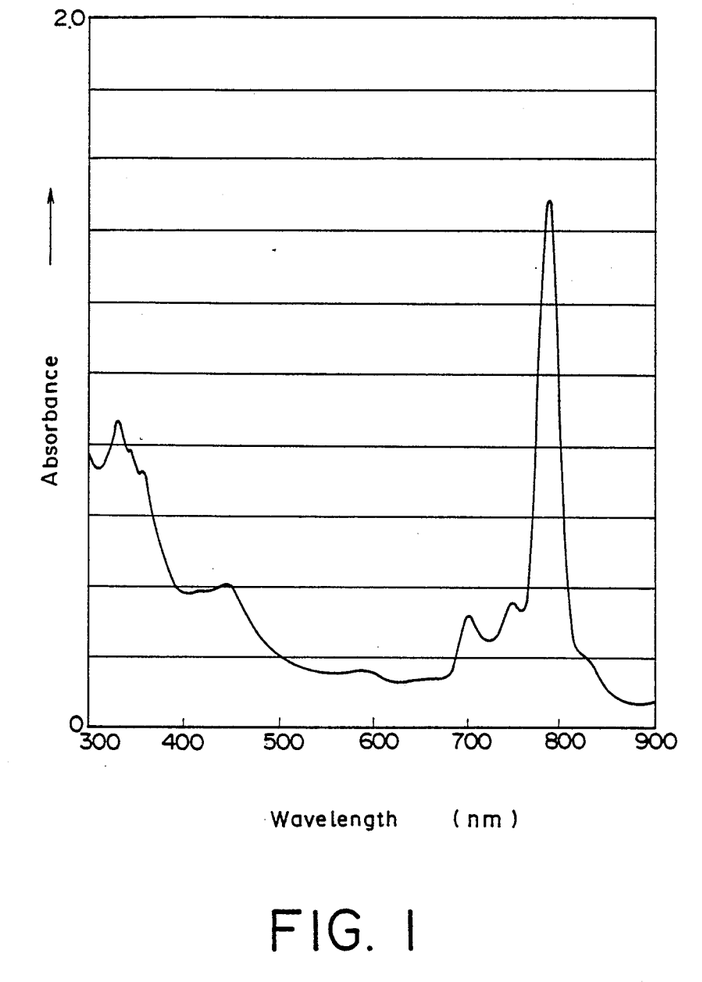
FIG. 1 is an electronic spectrum of tetrakis(trimethylsilyl)naphthalocyanino-dichlorogermanium in Example 1.
Figure 2:
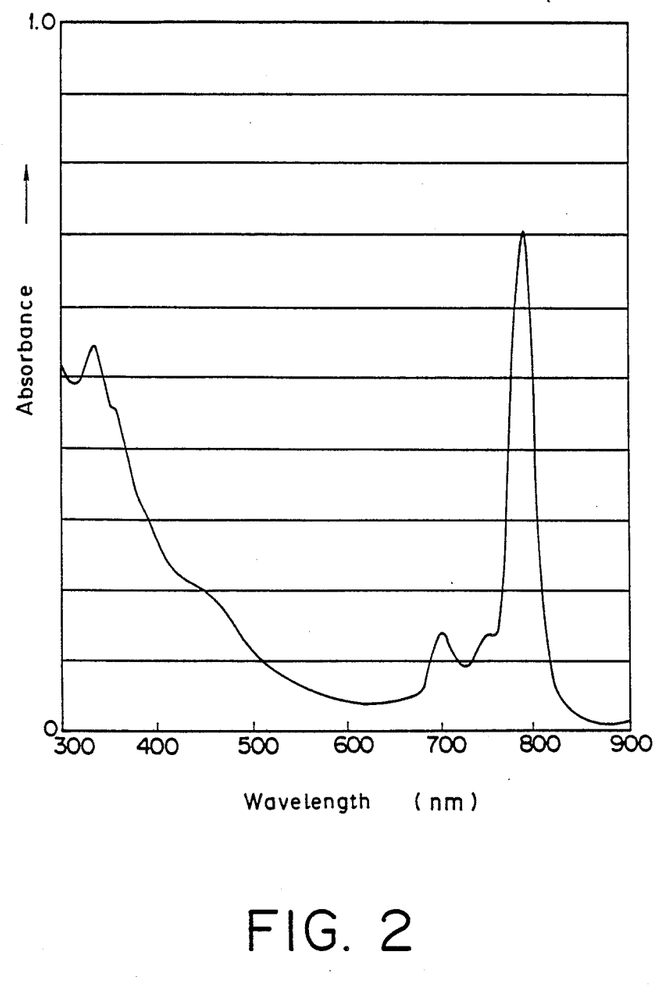
FIG. 2 is an electronic spectrum of tetrakis(trimethylsilyl)naphthalocyanino-dihydroxygermanium in Example 1.
Figure 3:
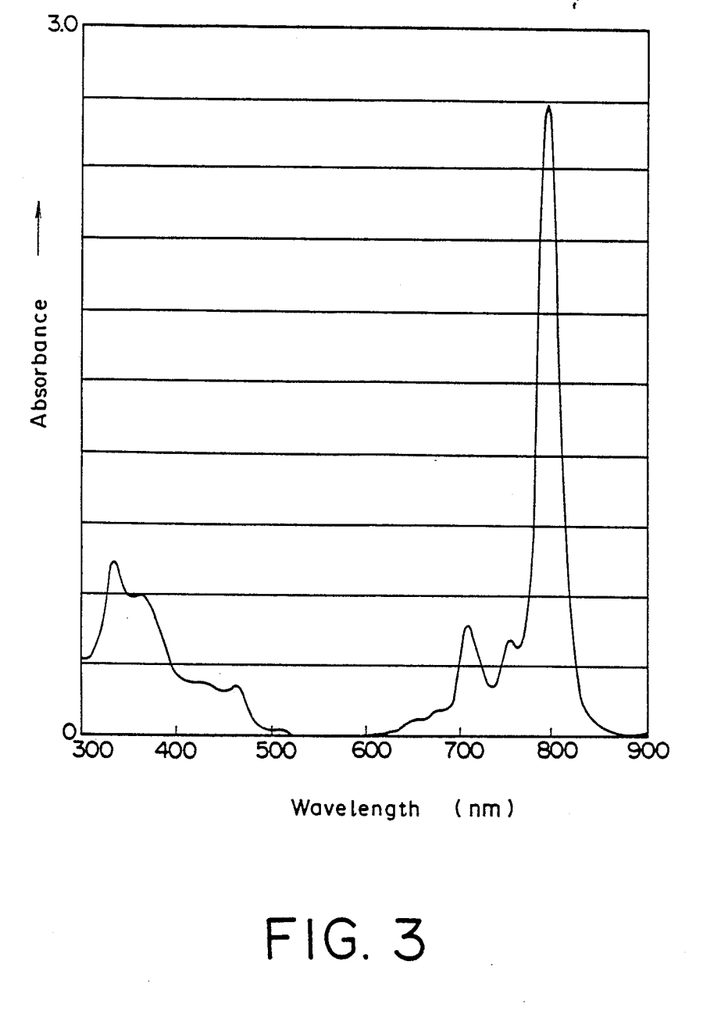
FIG. 3 is an electronic spectrum of bis(triethylsilyloxy)tetrakis(trimethylsilyl)naphthalocyanino-germanium in Example 1.

(iii) Synthesis of
bis(triethylsilyloxy)-tetrakis-(trimethylsilyl)naphthalocyanino-germanium To a mixture of 12.5 g of 6-trimethylsilyl-2,3-dicyanonaphthalene, about 100 mg of ammonium molybdate and 50 g of urea, 2.8 ml of germanium tetrachloride were added, followed by heating at 240° C. for 2.5 hours. After cooling, water was added to the reaction mixture. The resulting precipitate was filtered and washed with water and then with methanol sufficiently, thereby to obtain 0.68 g of a black-green crystal. The electronic spectrum (CHCl$_3$ solution) of this crystal is shown in FIG. 1. It could be presumed from the results of the spectrum that the crystal was tetrakis(trimethylsilyl)naphthalocyaninodichlorogermanium, which was used for the next reaction without any further purification. Then, 0.38 g of the thus obtained crystal was added to a mixed solvent containing 39 ml of water, 10 ml of ethanol and 10 ml of concentrated ammonia water, and reflux was carried out for about 2 hours. After cooling, the reaction mixture was filtered, washed with methanol about 10 times, and dried, to obtain 0.29 g of a black-green solid. The electronic spectrum (CHCl$_3$ solution) of this solid is shown in FIG. 2. It could be presumed from the results of the spectrum that this solid was tetrakis(trimethylsilyl)naphthalocyanino-dihydroxygermanium, which was then used for the next reaction without any further purification. One gram of triethylsilanol was added to 20 ml of chlorobenzene solution containing 0.21 g of the thus obtained black-green solid, and reflux was carried out for about 1 hour, followed by continuing concentration until the amount of the solution was approximately halved. After cooling, about 100 ml of methanol were added thereto, and the resulting precipitate was then collected by filtration and washed with methanol sufficiently. The washed solid was then subjected to an alumina column chromatography using benzene as a developing solvent, thereby to obtain 0.13 g of a green crystal. It was confirmed from the undermentioned analytical results that the thus obtained crystal was bis(triethylsilyloxy)-tetrakis(trimethylsilyl)naphthalocyanino-germanium. The electronic spectrum (CHCl$_3$ solution) is shown in FIG. 3. The results of the elemental analysis are as follows:

|  | C | H | N |
| --- | --- | --- | --- |
| Calcd. (%) | 66.93 | 6.71 | 8.67 |
| Found (%) | 67.18 | 6.85 | 8.41 |

Formation of the Recording Medium and Recording Test

Bis(triethylsilyloxy)-tetrakis(trimethylsilyl)naphthalocyanino-germanium  [(C$_2$H$_5$)$_3$SiO]$_2$GeNC-[Si(CH$_3$)$_3$]$_4$ synthesized in the above manner was dissolved in chloroform, and a glass substrate was coated with this material by means of a spin coating method to obtain a recording layer having a thickness of 70 nm. The recording medium thus obtained was then irradiated with a laser diode beam having a wavelength of 830 nm on the side of the glass substrate, to evaluate the recording characteristics. As a result, it was appreciated that recording was possible at 4.9 mW. Further, the reading stability of the medium was evaluated by irradiating a reading beam at 1 mW repeatedly, and it was appreciated that its reflectance did not change even when the irradiation was repeated $10^6$ times.

EXAMPLE 2

Bis(trihexylsilyloxy)-tetrakis(trimethylsilyl)naphthalocyanino silicon $[(n-C_6H_{13})_3SiO]_2SiNc[Si(CH_3)_3]_4$ (Exemplary compound No. 1) was dissolved in toluene, and a recording layer having a thickness of 50 nm was formed on a glass substrate by means of a spin coating method. The resulting recording medium was then irradiated with a laser diode beam having a wavelength of 830 nm on the side of the glass substrate in the same manner as in Example 1, to evaluate the recording characteristics. As a result, it was appreciated that the recording operation was possible at a beam diameter of 1.6 μm, a linear velocity of 0.5 m/sec. and 4.2 mW. Further, to evaluate the reading stability, a reading beam at 1 mW was irradiated repeatedly in the same manner as in Example 1, and it was appreciated that change in reflectance did not occur even when the irradiation was repeated $10^6$ times.

COMPARATIVE EXAMPLE

Cyanine type dye NK-2905 (made by Nippon Kanko-Shikiso Kenkyusho Co., Ltd.)) was dissolved in dichloroethane, and a recording layer having a thickness of 50 nm was formed on a glass substrate by means of a spin coating method. This recording medium was irradiated with a laser beam in the same manner as in Example 1, and in this case, the recording operation was possible at 4.8 mW. However, according to the evaluation of the reading stability, the reflectance of the medium began to decrease from a point of about $4 \times 10^4$ times of the irradiation and lowered to 70% of the initial reflectance after the irradiation was repeated $10^6$ times.

EXAMPLE 3

A glass substrate was coated with bis(tributylsilyloxy)-tetrakis(trimethylsilyl)naphthalocyanino-tin $[(n-C_4H_9)_3-SiO]_2-SnNc[Si(CH_3)_3]_4$ (Exemplary compound No.4) by means of a spin coating method to obtain a recording layer having a thickness of 80 nm. The obtained recording medium was then irradiated with a laser beam in the same way as in Example 1, and it was appreciated that recording was possible at 5.8 mW. Further, the reading stability of the medium was evaluated in the same manner as in Example 1, and it was also appreciated that its reflectance did not change even when the irradiation was repeated $10^6$ times.

EXAMPLE 4

A polycarbonate substrate was coated with each of naphthalocyanine compounds shown in the following table by a vapor deposition method to form a recording medium thereon having a thickness of 50 nm. Recording/reading out properties and reading stability were evaluated in the same manner as in Example 1, and the results are set forth in the following table.

TABLE

| Naphthalocyanine compound | Recording sensitivity | Reading stability |
|---|---|---|
| $C_6H_5OAlNc[Si(CH_3)_3]_4$ (Exemplary compound No. 5) | 5.5 mW | $>10^6$ times |
| $[(n-C_3H_7)_3SiO]_2TiNc[Si(CH_3)_3]_4$ (Exemplary compound No. 6) | 5.0 mW | $>10^6$ times |
| $(C_2H_5O)_2SiNc[Si(C_6H_5)_3]_4$ (Exemplary compound No. 8) | 4.6 mW | $>10^6$ times |
| $[(C_6H_5)_3SiO]_2SiNc[Si(C_2H_5)_3]_4$ (Exemplary compound No. 9) | 4.4 mw | $>10^6$ times |

EXAMPLE 5

A mixture of $[(n-C_6H_{13})_3SiO]_2SiNc[Si(CH_3)_3]_4$ and polystyrene in a ratio of 2:1 was dissolved in toluene, and a glass substrate was coated with the resulting mixture to obtain a recording layer having a thickness of 60 nm. Evaluation was made in the same manner as in Example 1, and it was appreciated that the recording sensitivity and reading stability of the recording layer were 4.8 mW and $10^6$ times or more, respectively.

The optical information recording medium of the third aspect of the present invention by use of a new naphthalocyanine dye of the first aspect prepared in accordance with the second aspect of the present invention have been found to have excellent recording/reading out properties, and improved reading stability as compared with conventional organic dye recording mediums.

We claim:

1. A novel naphthalocyanine dye represented by the following general formula (I):

wherein R is an alkyl group having 1 to 22 carbon atoms or an aryl group and three Rs may be the same or different; M is selected from the group consisting of Si, Al, Ti, Ge and Sn;

$Y_1$ and $Y_2$ are selected from the group consisting of OR', OAr, OSi(R')$_3$, OSi(Ar)$_3$ and OC(Ar)$_3$ and may be the same or different, with the proviso that when M is Al, $Y_1$ alone should be bound to M and $Y_2$ is absent, in which R' is an alkyl group having 1 to 22 carbon atoms, and Ar is an aryl group or an aralkyl group.

2. The naphthalocyanine dye according to claim 1, wherein both $Y_1$ and $Y_2$ in said general formula (I) are OR' or OAr.

3. The naphthalocyanine dye according to claim 1, wherein both $Y_1$ and $Y_2$ in said general formula (I) are OSi(R')$_3$ or OSi(Ar)$_3$.

4. The naphthalocyanine dye according to claim 1, wherein in said general formula (I), all of said three Rs are a methyl group; M is Si; both $Y_1$ and $Y_2$ are a trihexylsilyloxy group.

5. The naphthalocyanine dye according to claim 1, wherein in said general formula (I), all of said three Rs are a methyl group, M is Ge, both of $Y_1$ and $Y_2$ is a triethylsilyloxy group.

6. An optical information recording medium which comprises a recording layer on which information can be recorded to form pits and to be read directly afterwards by means of a laser providing a light of predetermined frequency, said information being readable by the difference in reflection between areas of the recording layer in which pits have not been formed and areas in which pits have been formed, said recording layer comprising an organic film containing a naphthalocyanine dye represented by the following general formula (I) as a main component formed on a substrate:

wherein R is an alkyl group having 1 to 22 carbon atoms or an aryl group and three Rs may be the same or different; M is selected from the group consisting of Si, Al, Ti, Ge and Sn; $Y_1$ and $Y_2$ are selected from the group consisting of OR', OAr, OSi(R')$_3$, OSi(AR)$_3$, and OC-(AR)$_3$ and may be the same or different, with the proviso that when M is Al, $Y_1$ alone should be bound to M and $Y_2$ is absent, in which R' is an alkyl group having 1 to 22 carbon atoms, and Ar is an aryl group or an aralkyl group.

7. The optical information recording medium according to claim 6, wherein both $Y_1$ and $Y_2$ in said general formula (I) are OR' or OAr.

8. The optical information recording medium according to claim 6, wherein both $Y_1$ and $Y_2$ in said general formula (I) are OSi(R')$_3$ or OSi(Ar)$_3$.

9. The optical information recording medium according to claim 6, wherein in said general formula (I), all of said three Rs is a methyl group, M is Si, both $Y_1$ and $Y_2$ is a trihexylsilyloxy group.

10. The optical, information recording medium according to claim 6, wherein in said general formula (I), all of said three Rs is a methyl group, M is Ge, both $Y_1$ and $Y_2$ is a triethylsilyloxy group.

11. The optical information recording medium according to claim 6, wherein the medium further contains a polymer in addition to the naphthalocyanine dye, as a main component.

12. The optical information recording medium according to claim 6, wherein said substrate is formed of a material selected from the group consisting of glass, quartz, ceramic, plastic, paper and metal.

* * * * *